May 15, 1956     J. G. SCHWEIGERT     2,745,158
TIE-DOWN CLAMP
Filed Aug. 21, 1952     2 Sheets-Sheet 1
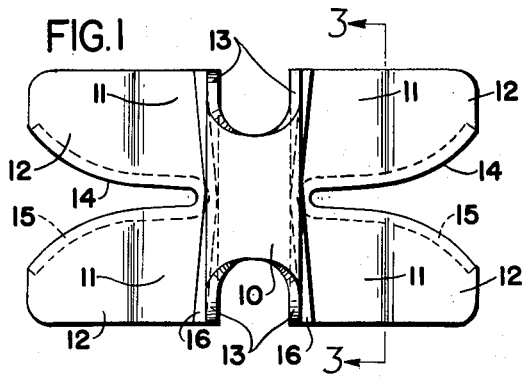
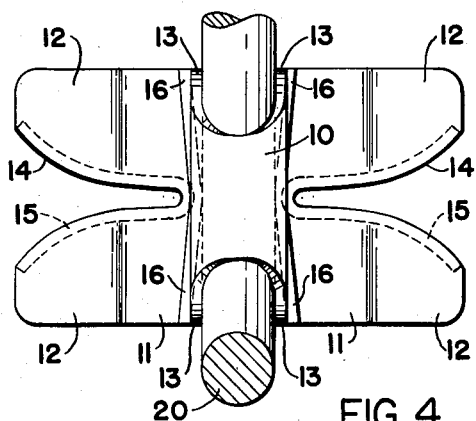
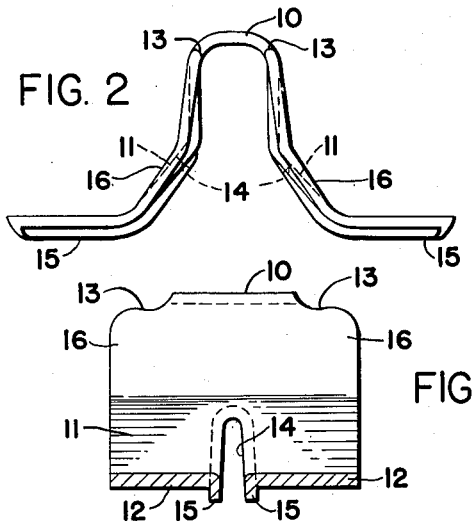
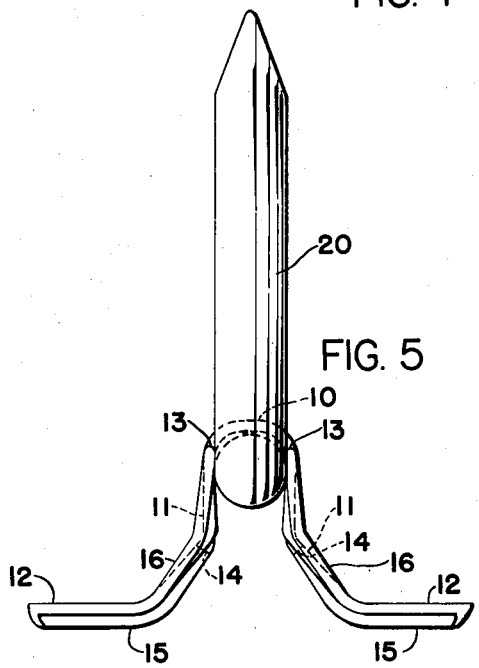
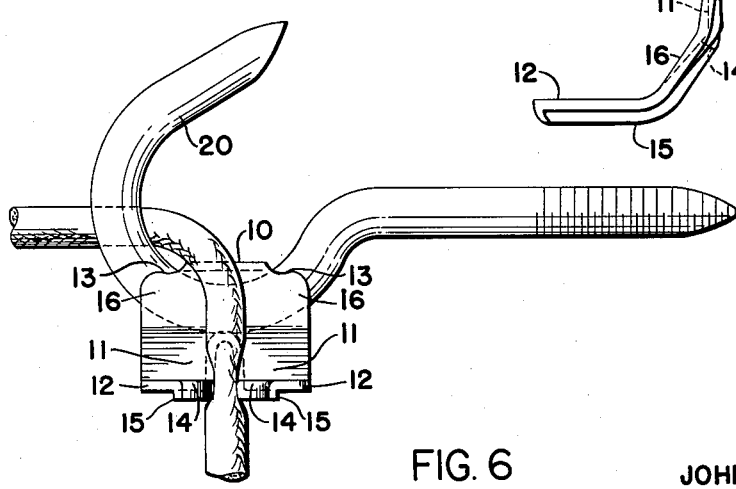
INVENTOR.
JOHN G. SCHWEIGERT
BY
ATTORNEYS

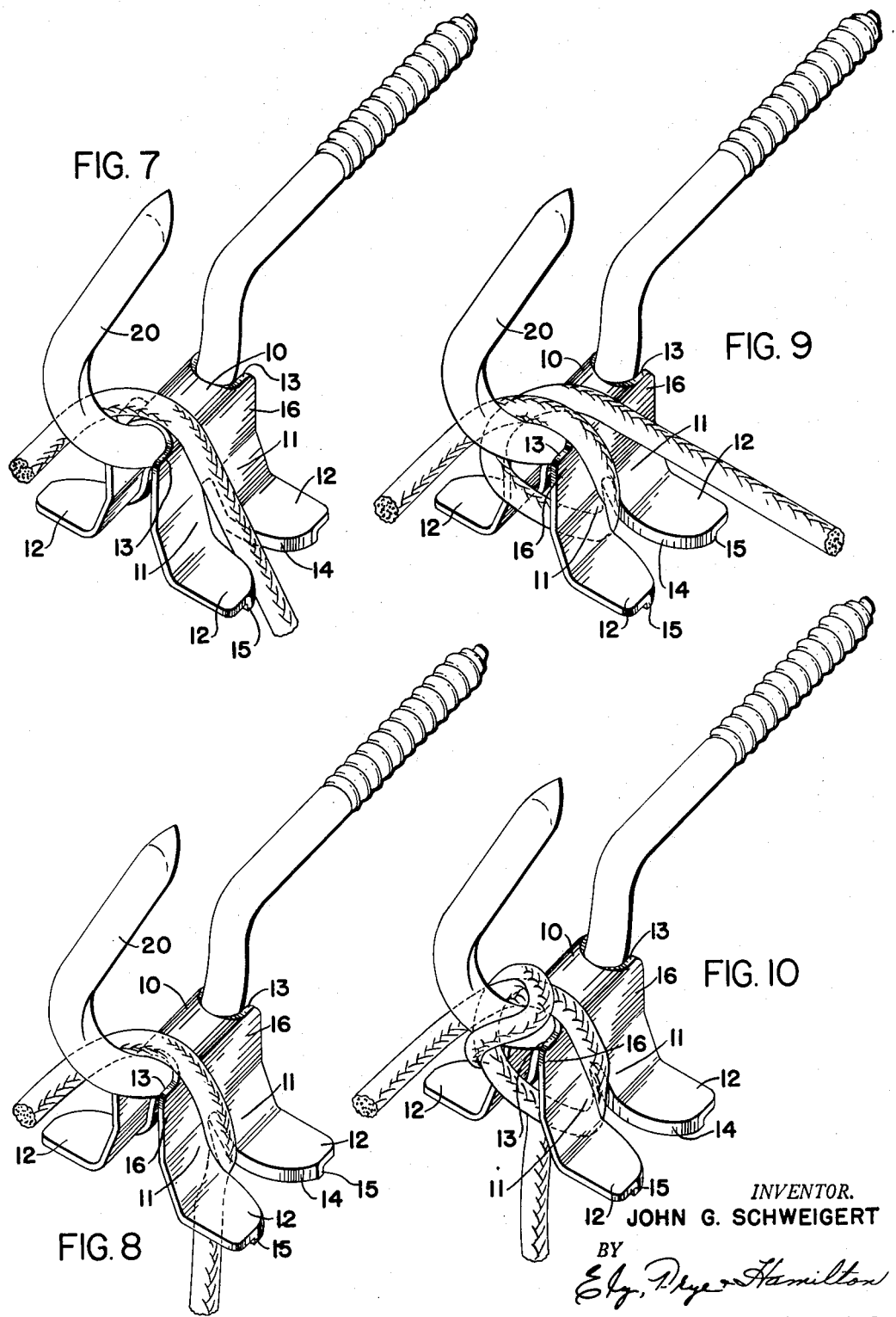

United States Patent Office 2,745,158
Patented May 15, 1956

2,745,158

TIE-DOWN CLAMP

John G. Schweigert, Garfield Heights, Ohio

Application August 21, 1952, Serial No. 305,592

1 Claim. (Cl. 24—130)

This invention relates to a line tie-down clamp particularly adapted for use as a convenient and secure clothesline fastener.

The inconvenience of securing or tying down taut clotheslines has led in the past to the provision of numerous types of tie-down devices or clamps designed to simplify the clothesline fastening problem. Most of these devices, however, do not securely fasten the line; those that do are either too complicated or too bulky and costly and inconvenient to make their use practical. A particular disadvantage of previous clothesline fasteners has been the pulling and tugging in awkward directions that is necessary in order to keep the line taut while attempting to wedge or clamp the line securely in place.

I have invented a wedging clip or clamp which, by its peculiar coaction with a clothesline which is to be secured by it, acts as a self-energizing clamp which utilizes the resiliency of the tightened line to cause the line to draw itself into firmly wedged engagement with the clamp. Furthermore, the line is not merely progressively and gradually clamped more tightly as it moves deeper into wedging engagement, as is the case with previous wedging clamps, but rather the line slips quite readily into its final wedging position at which position the wedging grip becomes most tight and the area of clamping contact between the line and the clip is suddenly greatly increased. Thus, the line wedges in easily but clamps positively at a definite final position as will be more fully explained below.

A particular advantage of my invention is that it may be inexpensively and directly formed by stamping operations on standard strip stock such as 16 guage hot-rolled oil-quenched steel strip. The manufacture of my clip does not require the use of any special spring steel or stainless steel alloys. Between the raw strip stock and the final finished product are only two or three simple stamping operations.

The particular embodiment of my invention which I have disclosed herein is designed for use on clothesline hooks that have been already installed. The simplicity and conformation of my wedging fastener makes possible and practical the provision of the disclosed independent fastening clip which can be anchored on a clothesline hook. However, the utility of my wedging fastener is not limited to independent clips and it will be apparent from the disclosure below that this fastener may, if desired, be readily combined as an integral part of a complete hook-and-fastener assembly.

Other objects and advantages of my fastener will become apparent from the more specific description of the invention set forth in the following specification and in the accompanying drawings in which:

Figure 1 is a plan view of a clip embodying my fastener.

Figure 2 is a front view of the clip shown in Figure 1.

Figure 3 is a side view taken on line 3—3 in Figure 1.

Figure 4 is a view similar to Figure 1 showing the clip engaged with a hook.

Figure 5 is a front view of the assembly shown in Figure 4.

Figure 6 is a side view of the assembly shown in Figure 4.

Figure 7 illustrates the initial position of a clothesline to be anchored by my clip.

Figure 8 illustrates the final position of the clothesline.

Figure 9 illustrates the final position of a clothesline which is to be continued to another hook.

Figure 10 illustrates the final position of a clothesline which is double anchored.

The illustrated clip comprises generally a channel or hood portion 10, flared skirt portions 11 and foot portions 12. All of these parts of the clip are integral. Two end locking notches 13 are formed at the upper ends of the hood portion 10 and an inwardly converging wedging notch 14 extends from the side edge of each foot portion 12 to an upper central location on each skirt portion 11. A downwardly or inwardly extending lip 15 may be formed along the edge of each wedging notch 14.

The conformation of the notches 14 may be most clearly seen in Figure 1. Each notch converges relatively abruptly inwardly from the outer edges of the foot 12 in which it is formed. However, as the skirt portion 11 is approached, the abruptness of convergence diminishes so that the sides of that section of the notch which extends up into the skirt portion 11 are either parallel or continue to converge to only a very slight extent.

All figures subsequent to Figure 3 show the clip in engagement with a hook 20 with which it is to be used. When the clip is inserted on the hook 20, the notches 13 accommodate the upwardly curving sides of the hook allowing the hook to rest snugly within the clip. At the same time, the vertical spread in the line of contact between each inner side of the hood 10 with the facing side of the hook 20 holds the clip rigidly against rotation with respect to the hook.

In order to accommodate hooks of widely varying dimensions and conformations, it has been found preferable to slightly flare the sides of the hood 10 longitudinally outwardly (see Figure 1) and downwardly (see Figure 2) as at 16. The clip can then be more readily bent into snug contact with relatively light hooks and can also be used with tapered hooks that are not of uniform thickness, such hooks fitting snugly at the center of the clip and at the end of the clip where the hook is thickest. This clip can readily accommodate hooks varying in thickness by as much as a factor of two. The commercial embodiment of this clip has been found to be usable with hooks ranging from $\frac{3}{8}$ inch to $\frac{3}{16}$ inch in thickness.

Perhaps the outstanding feature of my invention is the snubbing action of each "bent" slot 14. A line to be fastened is passed over the hook and down through the mouth of the slot 14, as shown in Figure 7. By convenient downward pulling, the line is tightened to the desired degree and is then moved to the left as viewed in Figure 7 until the line comes into operative engagement with the sides of the slot 14. The taut line is thus crowded into the slot and its sides are grooved or channeled by the edges of the slot for tracking engagement. The line thereupon tracks up into the upper end of the slot and as it reaches its final clamping position the angular offset between the foot portion 12 and the skirt portion 11 causes the area of contact with the lip 15 or the edge of the slot to suddenly become almost doubled. The line is thus finally held by an extremely tight and firm grip. It is to be noted that no upward reaching or tugging by the user is required, the work necessary to pull the line into fully engaged position having been done ahead of time, so to speak, when the line was initially pulled down over the hook and made taut.

After the line moves itself into clamped position it is fully secured and ready for use and the end of the line may simply be left dangling as shown in Figure 8. If the line is to be continued to other hooks, it may be passed through the hood portion 10 and up over the hook and thence on to the next hook as illustrated in Figure 9.

If a line end is to be installed semi-permanently outdoors it may be subjected to repeated wetting and drying and the attendant swelling and shrinkage of the line may, over a period of time, tend to loosen the clamping engagement of a single notch 14. For such semi-permanent use, it may therefore be desired to double-anchor the line. This is done by passing the clamped line through the hood 10 and over the hook (as in Figure 9) and thence down and across and into the remaining empty notch 14, as shown in Figure 10.

If desired the edges of the notches 14 or the lips 15 may be coined. Also, as previously mentioned, my clamp or fastener may be included as part of an integral hook assembly rather than as part of a removable clip. My disclosure will suggest many other modifications and variations and, accordingly, the scope of my invention is to be defined solely by the following claim and is not to be limited to the specific embodiment I have illustrated.

What is claimed is:

In a tie-down clamp, a strap having its central portion bent in the shape of a thin U, the sides of which, when the U is inverted, are spaced apart a distance to allow the U to be placed over a clothesline hook with the sides of the U engaging the sides of the hook along arcuate lines of contact and the base of the U received within the crook of the hook, hook-receiving notches in each end of the base of the U to allow the base of the U to seat deep within the crook of the hook, the ends of said strap flaring outwardly from said central U-shaped portion and terminating in two endmost edges, a tie-down notch in each of said endmost edges, each of said tie-down notches extending back into one of said outwardly flaring end portions of said strap, whereby, when said strap is engaged with a clothesline hook as above recited and a rope is passed through the crook of the hook to contact the base of the U and is then pulled downwardly into one of said tie-down notches to be anchored thereby, turning of the strap is prevented by said hook-strap engagement along arcuate lines of contact and lifting of said strap is counteracted by bearing-down of said rope on the base of the U.

References Cited in the file of this patent

UNITED STATES PATENTS

| | | |
|---|---|---|
| 74,070 | Fletcher | Feb. 4, 1868 |
| 192,789 | Peteler | July 3, 1877 |
| 429,549 | Smith | June 3, 1890 |
| 686,477 | Priddat | Nov. 12, 1901 |
| 887,558 | Werner | May 12, 1908 |
| 1,751,762 | Schonberger | Mar. 25, 1930 |
| 1,870,172 | Buschhaus | Aug. 2, 1932 |

FOREIGN PATENTS

| | | |
|---|---|---|
| 6,777 | Great Britain | Apr. 8, 1892 |